United States Patent
Takahashi et al.

(10) Patent No.: US 12,174,492 B2
(45) Date of Patent: Dec. 24, 2024

(54) TRANSPARENT SUBSTRATE FOR LIQUID CRYSTAL DEVICE AND LIGHT CONTROL SHEET

(71) Applicant: TOPPAN Inc., Tokyo (JP)

(72) Inventors: Yusuke Takahashi, Taito-ku (JP); Daisuke Yamashita, Taito-ku (JP)

(73) Assignee: TOPPAN Inc., Tokyo (JP)

( * ) Notice: Subject to any disclaimer, the term of this patent is extended or adjusted under 35 U.S.C. 154(b) by 0 days.

(21) Appl. No.: 18/487,433

(22) Filed: Oct. 16, 2023

(65) Prior Publication Data

US 2024/0061291 A1 Feb. 22, 2024

Related U.S. Application Data

(63) Continuation of application No. PCT/JP2022/018569, filed on Apr. 22, 2022.

(30) Foreign Application Priority Data

Apr. 22, 2021 (JP) ................................. 2021-072532

(51) Int. Cl.
*G02F 1/1337* (2006.01)
(52) U.S. Cl.
CPC .... *G02F 1/133711* (2013.01); *G02F 2201/50* (2013.01)
(58) Field of Classification Search
CPC ................................................ G02F 1/133711
USPC ......................................... 349/112, 123–136
See application file for complete search history.

(56) References Cited

U.S. PATENT DOCUMENTS

| | | | | |
|---|---|---|---|---|
| 2014/0106131 A1* | 4/2014 | Ikai | ........................ | G06F 3/041 428/172 |
| 2019/0212599 A1* | 7/2019 | Ryu | ........................... | C08J 5/18 |
| 2021/0054156 A1* | 2/2021 | Kim | ........................... | C08J 5/18 |

FOREIGN PATENT DOCUMENTS

| | | |
|---|---|---|
| JP | H07-239484 A | 9/1995 |
| JP | 07-0270763 A | 10/1995 |
| JP | 2006-154158 A | 6/2006 |
| JP | 2014-095896 A | 5/2014 |
| JP | 2015-007732 A | 1/2015 |
| JP | 2018-045135 A | 3/2018 |

(Continued)

OTHER PUBLICATIONS

International Search Report issued Jul. 12, 2022 in PCT/JP2022/018569, filed Apr. 22, 2022, 7 pages.

(Continued)

*Primary Examiner* — Charles S Chang
(74) *Attorney, Agent, or Firm* — Oblon, McClelland, Maier & Neustadt, L.L.P.

(57) ABSTRACT

A transparent substrate for a liquid crystal device includes an alignment layer that regulates an alignment direction of liquid crystal molecules contained in a light control layer included in a light control sheet, which is the liquid crystal device, and a base layer on which the alignment layer is formed. The substrate includes a first surface and a second surface opposite to the first surface. The first surface is part of the alignment layer. The second surface is part of the base layer. A surface, which contacts the alignment layer, of the base layer has surface roughness Ra1 of 20 nm or less in a pencil hardness test. A sum Ra1+Ra2 of the surface roughness Ra1 and surface roughness Ra2 of the second surface is 5 nm or more.

20 Claims, 3 Drawing Sheets

(56) References Cited

FOREIGN PATENT DOCUMENTS

JP          2019-174760  A    10/2019
WO    WO 2016/088807  A1     6/2016

OTHER PUBLICATIONS

Extended European Search Report issued Oct. 2, 2024 in European Application No. 22791822.4, 8 pages.

* cited by examiner

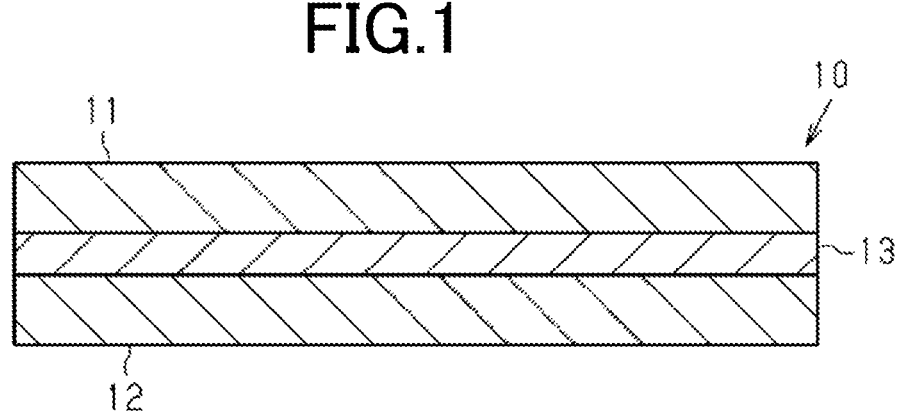
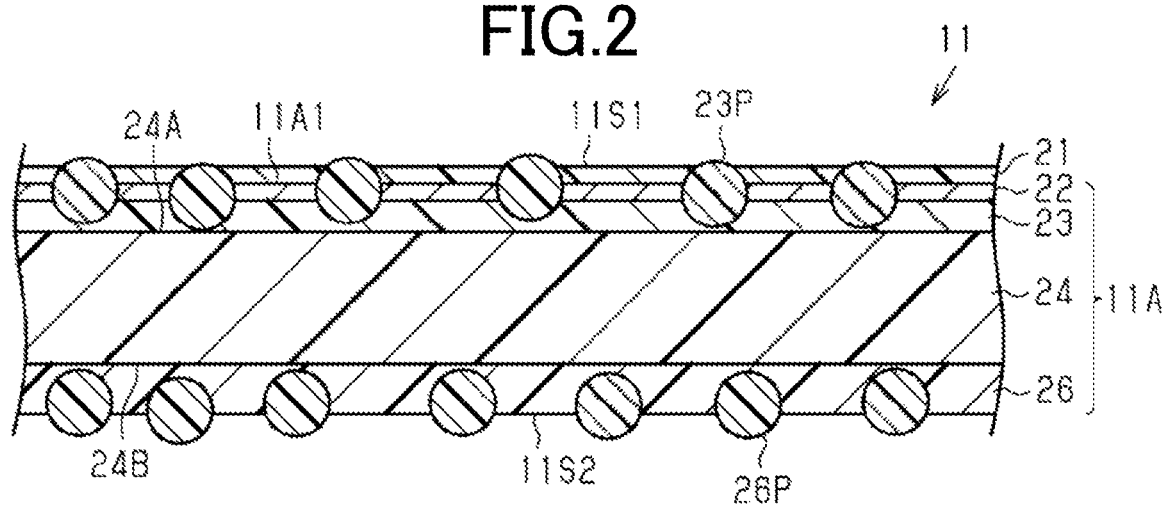

FIG.4

| | HARD COAT LAYER | | LUBRICIOUS LAYER | FIRST SURFACE | SECOND SURFACE | | EVALUATION RESULTS | | | | LIGHT CONTROL SHEET | | | OVERALL EVALUATION |
|---|---|---|---|---|---|---|---|---|---|---|---|---|---|---|
| | | | | | | | BASE LAYER | SINGLE FILM | | | | | | |
| | BASE LAYER | AMOUNT OF ADDED PARTICLES (% BY WEIGHT) | AMOUNT OF ADDED PARTICLES (% BY WEIGHT) | SURFACE ROUGHNESS Ra1 (nm) | SURFACE ROUGHNESS Ra2 (nm) | Ra1 + Ra2 (nm) | PENCIL HARDNESS | HAZE (%) | APPEARANCE | HAZE (0V) | HAZE (40V) | NUMBER OF DEFECTS | |
| EXAMPLE 1 | FIRST COATING MATERIAL | 0.020 | 0.02 | 4 | 3 | 7 | H | 0.5 | OK | 7 | 91 | 2 | OK |
| EXAMPLE 2 | FIRST COATING MATERIAL | | 1.00 | 5 | 40 | 45 | H | 0.5 | OK | 7 | 91 | 5 | OK |
| EXAMPLE 3 | FIRST COATING MATERIAL | | 3.00 | 4 | 97 | 101 | H | 0.8 | OK | 7 | 91 | 6 | OK |
| EXAMPLE 4 | FIRST COATING MATERIAL | 0.025 | 0.02 | 6 | 5 | 11 | H | 0.6 | OK | 7 | 91 | 6 | OK |
| EXAMPLE 5 | FIRST COATING MATERIAL | | 1.00 | 9 | 35 | 44 | H | 0.5 | OK | 7 | 91 | 5 | OK |
| EXAMPLE 6 | FIRST COATING MATERIAL | | 3.00 | 6 | 100 | 106 | H | 0.8 | OK | 7 | 91 | 4 | OK |
| EXAMPLE 7 | FIRST COATING MATERIAL | 0.45 | 0.02 | 18 | 5 | 23 | H | 0.7 | OK | 7 | 91 | 2 | OK |
| EXAMPLE 8 | FIRST COATING MATERIAL | | 1.00 | 17 | 50 | 67 | H | 0.6 | OK | 7 | 91 | 6 | OK |
| EXAMPLE 9 | FIRST COATING MATERIAL | | 3.00 | 19 | 99 | 118 | H | 0.9 | OK | 7 | 91 | 0 | OK |
| EXAMPLE 10 | SECOND COATING MATERIAL | 0.000 | 3.00 | 2 | 98 | 100 | HB | 0.9 | OK | 8 | 91 | 2 | OK |
| EXAMPLE 11 | FIRST COATING MATERIAL | 0.020 | 4.00 | 4 | 125 | 129 | H | 3.0 | OK | 16 | 95 | 9 | OK |
| EXAMPLE 12 | FIRST COATING MATERIAL | 0.000 | 3.00 | 3 | 98 | 101 | H | 0.8 | OK | 7 | 91 | 2 | OK |
| EXAMPLE 13 | FIRST COATING MATERIAL | 0.000 | 0.10 | 2 | 5 | 7 | H | 0.5 | OK | 7 | 91 | 6 | OK |
| COMPARATIVE EXAMPLE 1 | FIRST COATING MATERIAL | 0.000 | 0.00 | 1 | 2 | 3 | H | 0.3 | NG | 6 | 92 | 50 OR MORE | NG |
| COMPARATIVE EXAMPLE 2 | FIRST COATING MATERIAL | 0.839 | 0.00 | 31 | 2 | 33 | H | 0.5 | OK | MEASUREMENT NOT POSSIBLE | MEASUREMENT NOT POSSIBLE | 50 OR MORE | NG |
| COMPARATIVE EXAMPLE 3 | ABSENT | ABSENT | 3.00 | 2 | 98 | 100 | 2B | 0.7 | OK | 7 | 94 | 50 OR MORE | NG |

TRANSPARENT SUBSTRATE FOR LIQUID CRYSTAL DEVICE AND LIGHT CONTROL SHEET

CROSS-REFERENCE TO RELATED APPLICATIONS

The present application is a continuation of and claims the benefit of priority to International Application No. PCT/JP2022/018569, filed Apr. 22, 2022, which is based upon and claims the benefit of priority to Japanese Application No. 2021-072532, filed Apr. 22, 2021. The entire contents of these applications are incorporated herein by reference.

BACKGROUND OF THE INVENTION

Field of the Invention

The present invention relates to a transparent substrate for a liquid crystal device, and a light control sheet.

Description of Background Art

JP-A-2018-45135 describes a reverse-type light control sheet including a light control layer including liquid crystal molecules, a pair of conductive layers (transparent electrodes) sandwiching the light control layer in the thickness direction of the light control layer, and alignment layers respectively located between the light control layer and the conductive layers. The entire contents of this publication are incorporated herein by reference.

SUMMARY OF THE INVENTION

According to one aspect of the present invention, a transparent substrate for a liquid crystal device includes a base layer, and an alignment layer formed on the base layer such that the alignment layer has a surface forming a first surface of the transparent substrate and that the base layer has a surface forming a second surface of the transparent substrate on the opposite side with respect to the first surface. The alignment layer regulates an alignment direction of liquid crystal molecules in a liquid crystal layer in the liquid crystal device, the base layer has a surface that is in contact with the alignment layer and has hardness of F or more in a pencil hardness test, and the first surface of the transparent substrate has a surface roughness Ra1 of 20 nm or less such that a sum Ra1+Ra2 of the surface roughness Ra1 of the first surface and surface roughness Ra2 of the second surface is 5 nm or more.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a cross-sectional view schematically illustrating a structure of a light control sheet according to a first embodiment of the present invention;

FIG. 2 is a cross-sectional view illustrating a structure of a transparent substrate for a liquid crystal device included in the light control sheet according to the first embodiment of the present invention;

FIG. 4 is a table illustrating evaluation results of examples and comparative example.

DETAILED DESCRIPTION OF THE EMBODIMENTS

Figure 3:
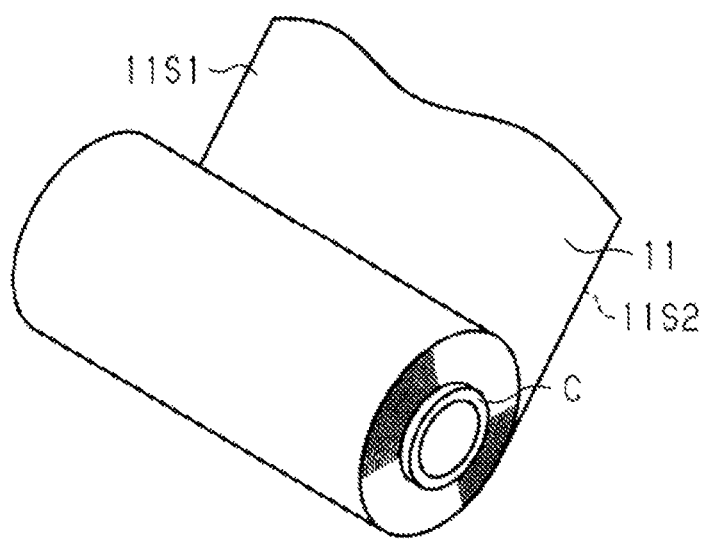
FIG. 3 is a perspective view illustrating a state when the transparent substrate for a liquid crystal device according to the first embodiment of the present invention is stored.

Embodiments will now be described with reference to the accompanying drawings, wherein like reference numerals designate corresponding or identical elements throughout the various drawings.

With reference to FIG. 1 to FIG. 3, a transparent substrate for a liquid crystal device and a light control sheet according to a first embodiment of the present invention will be described.

Light Control Sheet

With reference to FIG. 1, the light control sheet will be described.

As illustrated in FIG. 1, a light control sheet 10 includes a first substrate 11, a second substrate 12, and a light control layer 13. The light control layer 13 contains liquid crystal molecules. The light control layer 13 is an example of a liquid crystal layer. In the light control layer 13, the liquid crystal molecules may be a retained in a polymer network liquid crystal (PNLC) type or a polymer dispersed liquid crystal (PDLC) type. The liquid crystal molecule has negative dielectric anisotropy. In other words, the liquid crystal molecule is n type.

Each of the first substrate 11 and the second substrate 12 is an example of a transparent substrate for a liquid crystal device. Each of the substrates 11 and 12 has transparency with respect to visible light. Each of the substrates 11 and 12 includes an alignment layer. The alignment layer regulates an alignment direction of the liquid crystal molecules contained in the light control layer 13. Each of the substrates 11 and 12 is in contact with the light control layer 13. In each of the substrates 11 and 12, a surface contacting the light control layer 13 is a first surface.

Transparent Substrate for Liquid Crystal Device

With reference to FIG. 2, the transparent substrate for a liquid crystal device will be described.

FIG. 2 illustrates a cross-sectional structure of the first substrate 11, which is an example of the transparent substrate for a liquid crystal device. It is noted that the position of the second substrate 12 in the thickness direction of the light control sheet 10 differs from that of the first substrate 11, whereas layers included in the second substrate 12 are common to those included in the first substrate 11. Hence, hereinafter, the structure of the first substrate 11 will be described in detail, whereas the detailed description of the structure of the second substrate 12 will be omitted.

The first substrate 11 includes a first surface 11S1 and a second surface 11S2 opposite to the first surface 11S 1. The first surface 11S1 is included in an alignment layer 21. The second surface 11S2 is included in a base layer 11A. The first surface 11S1 and the second surface 11S2 are opposed to each other.

The first substrate 11 includes the alignment layer 21 and the base layer 11A on which the alignment layer 21 is formed. In the base layer 11A, the surface opposite to the second surface 11S2 is a surface 11A1 contacting the alignment layer 21. The base layer 11A includes a support substrate 24, a hard coat layer 23, a conductive layer 22, and a lubricious layer 26. The surface 11A1 is included in the conductive layer 22. The support substrate 24 has a first surface 24A and a second surface 24B. The first surface 24A and the second surface 24B are opposed to each other. On the first surface 24A, the hard coat layer 23, the conductive layer 22, and the alignment layer 21 are laminated in this order. It is noted that, in FIG. 2, thicknesses of the layers are illustrated in schematic form for the sake of convenience.

The support substrate 24 is formed of, for example, synthetic resin. The synthetic resin may be, for example, polyethylene terephthalate (PET) or polyethylene naphthalate (PEN). The support substrate 24 may have a thickness, for example, 16 μm or more and 250 μm or less. The support substrate 24 has transparency with respect to visible light. The support substrate 24 is not limited to a single-layer structure, but may have a multi-layer structure. When the support substrate 24 has a multi-layer structure, the support substrate 24 may include a first layer formed of a first material and a second layer formed of a second material different from the first material.

The hard coat layer 23 is located between the support substrate 24 and the conductive layer 22. The strength of the hard coat layer 23 is higher than the strength of the support substrate 24. Hence, compared with a case in which the base layer 11A does not include the hard coat layer 23, the strength of the surface of the alignment layer 21 formed on the base layer 11A becomes higher.

The hard coat layer 23 may be formed of, for example, any of an organic material, a silicon-based material including silicon, and an inorganic material. The organic material is a synthetic resin, and may be any of, for example, a melamine resin, urethane resin, and acrylic resin. The silicon-based material may be a silane compound such as a silicone-based hard coat material. The inorganic material may be metallic oxide. The hard coat layer 23 may have a thickness of 1 μm or more and 10 μm or less. The hard coat layer 23 has transparency with respect to visible light. The hard coat layer 23 is not limited to a single-layer structure, but may have a multi-layer structure. When the hard coat layer 23 has a multi-layer structure, the hard coat layer 23 may include a first layer formed of a first material and a second layer formed of a second material different from the first material.

The hard coat layer 23 may include particles 23P. The particles 23 are added, in addition to a hard coating agent, which is a main component of the hard coat layer 23 and may be of a material different from the hard coating agent. The particles 23P may be formed of, for example, synthetic resin, or a silica-based inorganic material. The cross-sectional shape of the particle 23P may be circular, elliptical, or another shape. In the particles 23P contained in the hard coat layer 23, a diameter D1 of at least some of the particles 23P is greater than the sum (T1+T2+T3) of a thickness T1 of the hard coat layer 23, a thickness T2 of the conductive layer 22, and a thickness T3 of the alignment layer 21 (D1>T1+T2+T3). The thicknesses of the hard coat layer 23, the conductive layer 22, and the alignment layer 21 are thicknesses of portions at which no particle 26P is located. Hence, at least some of the particles 23P contained in the hard coat layer 23 externally project from the first surface 11S1. Hence, surface roughness of the first surface 11S1 is large. It is noted that when the hard coat layer 23 includes particles 23P having an elliptic cross-sectional shape or particles 23P having various sizes, only some of the particles 23P may be projected from the first surface 11S1.

The conductive layer 22 is located between the hard coat layer 23 and the alignment layer 21 in the thickness direction of the first substrate 11. Hence, when a voltage is applied to the conductive layer 22, an electric field having intensity that can drive liquid crystal molecules is easily formed between the conductive layer 22 of the first substrate 11 and the conductive layer of the second substrate 12.

The conductive layer 22 is formed of, for example, transparent conducting oxide (TCO). The TCO may be, for example, indium tin oxide (ITO), zinc oxide (ZnO), tin oxide ($SnO_2$), indium zinc oxide (IZO), indium-gallium-zinc oxide (IGZO), or the like. The conductive layer 22 may have, for example, a thickness of 5 nm or more and 100 nm or less. The conductive layer 22 has transparency with respect to visible light.

The alignment layer 21 is a vertical alignment film. The alignment layer 21 aligns liquid crystal molecules so that long axes of the liquid crystal molecules are orthogonal to the plane in which the alignment layer 21 extends. It is noted that an angle between the alignment layer 21 and the long axis of the liquid crystal molecule may be deviated from perpendicular within a range that can be regarded as substantially perpendicular. The alignment layer 21 has a siloxane bond containing silicon and oxygen as a skeleton and is a silicone resin in which organic groups are combined with the silicone or polyimide resin. Forming the alignment layer 21 from the above resin can enhance thermal stability and chemical stability of the alignment layer 21. The alignment layer 21 is formed of, for example, polyamic acid, polyimide, or polyvinyl alcohol (PVA). A surface of the alignment layer 21 may be subjected to rubbing treatment. The thickness of the alignment layer 21 may be, for example, 20 nm or more and 500 nm or less. The alignment layer 21 has transparency with respect to visible light.

On a second surface 24B of the support substrate 24, the lubricious layer 26 is formed. The synthetic resin may be, for example, any of melamine resin, urethane resin, and acrylic resin. The lubricious layer 26 may have a thickness of, for example, 1 μm or more and 10 μm or less. It is noted that the thickness of the lubricious layer 26 is a thickness of a portion at which no particles 26P are located. The lubricious layer 26 has transparency with respect to visible light.

The lubricious layer 26 may include particles 26P. The particles 26P may be formed of, for example synthetic resin. Alternatively, the particles 26P may be formed using an inorganic material such as a silica-based material. The particles 23P contained in the hard coat layer 23 and the particles 26P contained in the lubricious layer 26 may be formed of the same material or different materials. The particles 26P are added in addition to a coating material of the lubricious layer 26 and may be formed of a material different from a main component of the lubricious layer 26. In addition, the particles 23P and the particles 26P may be the same or different from each other in size. When the particles 26P are used as primary particles, a diameter D2 of at least some of the particles 26P of the particles 26P included in the lubricious layer 26 is greater than a thickness T4 of the lubricious layer 26 (D2>T4). When the particles 26P are agglomerated, at least some of agglomerated particles including particles may have a diameter greater than the thickness T4 of the lubricious layer 26. Hence, at least some of the particles 26P contained in the lubricious layer 26 or at least some of the agglomerated particle externally projects from the second surface 11S2. Hence, surface roughness of the second surface 11S2 is high.

Next, characteristics of the first substrate 11 will be described.

Since the support substrate 24 is thin and has high flexibility, the support substrate 24 is not suited for a single-sheet processing type manufacturing method. Hence, a roll-to-roll method is used for producing the first substrate 11 and the second substrate 12 and producing a light control sheet using the first substrate 11 and the second substrate 12. However, in the roll-to-roll method, defects are caused in the alignment layer 21 due to friction between contacting parts of a wound substrate, pressing force of the parts affecting each other, and the like.

Hence, in order to suppress defects of the alignment layer 21, the inventors enhanced the strength of the alignment layer 21. In addition, the inventors increased the surface roughness of the first surface 11S1 and the second surface 11S2 to improve lubricity, thereby reducing frictional force. At this time, if only the surface roughness of the second surface 11S2 is increased, haze becomes excessively increased when the light control sheet 10 is subjected to transparent driving. Hence, the inventors found that distributing surface roughness between the first surface 11S1 and the second surface 11S2 can reduce frictional force and reduce haze occurring when transparent driving is performed.

In order to satisfy both of increasing the strength of the alignment layer 21 and distributing and maintaining the surface roughness of the first surface 11S1 and the second surface 11S2, the first substrate 11 and the second substrate 12 satisfy at least following Conditions 1 to 3.

Condition 1: The surface 11A1 of the base layer 11A has hardness of F or more in a pencil hardness test.

Condition 2: The surface roughness Ra1 of the first surface 11S1 included in the alignment layer 21 is greater than 0 nm and 20 nm or less (0 nm<Ra1≤20 nm).

Condition 3: The sum Ra1+Ra2 of the surface roughness Ra1 of the first surface 11S1 and the surface roughness Ra2 of the second surface 11S2 is 5 nm or more (5 nm≤Ra1+Ra2).

Condition 1 will be described. High hardness of the surface 11A1 of the base layer 11A is achieved by the hard coat layer 23 included in the base layer 11A. Since the alignment layer 21 has a nano-order thickness, the alignment layer 21 has low hardness. According to the first substrate 11, since high pencil hardness is achieved by the hard coat layer 23, the alignment layer 21 can have high hardness while appropriately providing a regulation force for regulating alignment of the liquid crystal molecules. If hardness in the pencil hardness test for the surface 11A1 of the base layer 11A is lower than F, the strength of the alignment layer 21 is lowered, and defects in the alignment layer 21 are easily produced by frictional force or pressing force in the normal direction of the first surface 11S1.

It is noted that the pencil hardness test is performed by a method based on JIS K 5600-5-4 1999: "Testing methods for paints—Part 5: Mechanical property of Film—Section 4: Scratch Hardness (Pencil Method)". Since the hardness of the surface 11A1 of the base layer 11A is achieved by the hard coat layer 23, the pencil hardness of the surface of the hard coat layer 23 contacting the conductive layer 22 is also F or more. The pencil hardness of the alignment layer 21 itself contacting the surface 11A1 of the base layer 11A is lower than F. However, setting the film thickness to be in an appropriate range achieves pencil hardness of F or more when the alignment layer 21 is laminated on the hard coat layer 23 via the conductive layer 22.

Condition 2 will be described. The surface roughness Ra1 is an arithmetic mean roughness Ra of the first surface 11S1. Setting the surface roughness Ra1 of the first surface 11S1 in a range defined under Condition 2 and distributing required surface roughness between the first surface 11S1 and the second surface 11S2 can suppress excessive increase in haze due to the increased surface roughness Ra2 of the second surface 11S2. If the surface roughness Ra1 of the first surface 11S1 exceeds 20 nm (20 nm<Ra1), the alignment regulation force for aligning the liquid crystal molecules by the alignment layer 21 is partly lowered. Since liquid crystal molecules are randomly aligned in the portion in which the alignment regulation force is lowered, the portion is visually recognized as locally white turbid even when the light control sheet 10 is subjected to transparent driving. Furthermore, since the difference in height of a concavo-convex shape of the alignment layer 21 increases, external force is easily concentrated on a top portion having a convex shape and a bottom portion having a concave shape. As a result, when external force is applied to the alignment layer 21, defects are easily caused. Setting the surface roughness Ra1 of the first surface 11S1 to be in the range defined in Condition 2 can ensure an alignment regulation force of the alignment layer 21 to appropriately control haze of the light control sheet 10, whereby defects in the alignment layer 21 can be reduced. It is noted that when surface roughness is distributed between the first surface 11S1 and the second surface 11S2, the surface roughness Ra1 of the first surface 11S1 is preferably 2 nm or more.

Condition 3 will be described. The surface roughness Ra2 is arithmetic mean roughness Ra of the second surface 11S2. Setting the sum Ra1+Ra2 of the surface roughness of the first surface 11S1 and the second surface 11S2 to be in a range defined under Condition 3 can reduce frictional force generated between the first surface 11S1 and the second surface 11S2. If the sum Ra1+Ra2 of the surface roughness is lower than 5 nm (Ra1+Ra2<5 nm), the frictional force generated between the first surface 11S1 and the second surface 11S2 becomes excessive, and defects easily occur in the alignment layer 21. In addition, increase in the contact area between the first surface 11S1 and the second surface 11S2 easily causes blocking by which the first surface 11S1 and the second surface 11S2 adhere to each other and become difficult to peel from each other. Hence, when a film is drawn out from a film roll, the first surface 11S1 and the second surface 11S2 which are adhered to each other are forcibly peeled from each other, whereby defects are caused in the alignment layer 21.

Furthermore, the first substrate 11 and the second substrate 12 preferably satisfy, in addition to Conditions 1 to 3, following Conditions 4 and 5.

Condition 4: The surface roughness Ra2 of the second surface 11S2 included in the lubricious layer 26 is greater than 0 nm and 100 nm or less (0<Ra2<100 nm).

Condition 5: The sum Ra1+Ra2 of the surface roughness is 120 nm or less (Ra1+Ra2<120 nm).

Condition 4 will be described. Setting the surface roughness Ra2 of the second surface 11S2 to be in the range defined under Condition 4 can increase transparency of the light control sheet 10 when transparent driving is performed. Haze of the light control sheet 10 occurring when driving is performed is preferably 20% or less. The haze may preferably be 15% or less depending on uses that specifically require transparency when transparent driving is performed. If the haze occurring when transparent driving is performed exceeds 20%, objects are difficult to identify with the naked eye through the light control sheet 10. The haze of the light control sheet 10 is determined depending on an external haze, which is scattering at an interface between the first substrate 11 and air and at an interface between the second substrate 12 and air, and an internal haze caused by factors related to the internal structure of the light control sheet 10 such as the difference between refractive indexes of the particles 26P and the lubricious layer 26, decrease in the alignment force of the alignment layer 21 described above, and the like. In the above, surface roughness of the second surface 11S2 changes the external haze. That is, scattering of visible light at the second surface 11S2 increases, and the haze of the first substrate 11 and the second substrate 12 increases. If the surface roughness Ra2 of the second surface 11S2 exceeds 100 nm, transparency obtained when the light control sheet 10 is subjected to transparent driving can ensure practicality depending on the use, though the haze exceeds 15%.

Condition 5 will be described. In a state in which Condition 1 is satisfied, if the sum Ra1+Ra2 of the surface roughness of the first surface 11S1 and the second surface 11S2 is 120 nm, haze of the light control sheet 10 when transparent driving is performed can be suppressed from excessively increasing while the alignment regulation force of the alignment layer 21 is maintained. Specifically, the haze of the light control sheet 10 when transparent driving is performed can be 15% or less. If the sum Ra1+Ra2 of the surface roughness of the first surface 11S1 and the second surface 11S2 exceeds 120 nm, the haze occurring when transparent driving is performed exceeds 15%.

Functions

With reference to FIG. 3, functions of the first substrate 11 will be described.

When the light control sheet 10 is produced by using the first substrate 11, the first substrate 11 is transferred by roll-to-roll equipment along the longitudinal direction of the first substrate 11. At this time, tension is applied to the first substrate 11 along the longitudinal direction, and the first substrate 11 is transferred along the longitudinal direction while contacting a guide roll provided in the roll-to-roll equipment. Hence, when the first surface 11S1 of the first substrate 11 contacts the guide roll, friction is caused between the first surface 11S1 included in the alignment layer 21 and the guide roll. When the frictional force affecting the first surface 11S1 exceeds the strength of the first surface 11S1, defects, which are physical damage, occur in a portion of the alignment layer 21 affected by the frictional force. When the second surface 11S2 of the first substrate 11 contacts the guide roll, friction is generated between the second surface 11S2 included in the lubricious layer 26 and the guide roll. The defects are portions that are defective due to detachment of or damage to part of the alignment layer 21, whereby the alignment regulation force cannot be provided.

As illustrated in FIG. 3, since the first substrate 11 has a belt shape, when the first substrate 11 is conveyed from the roll-to-roll equipment to another device, or when the first substrate 11 is stored, the first substrate 11 has a roll shape wound around a core C.

When the first substrate 11 is wound around the core C, friction is generated between the first surface 11S1 and the second surface 11S2 of the first substrate 11. When the frictional force affecting the first surface 11S1 exceeds the strength of the first surface 11S 1, defects occur in portions of the alignment layer 21 affected by the frictional force. When the first substrate 11 is conveyed, since the first substrate 11 receives vibration, friction is generated between part of the first surface 11S1 of the first substrate 11 and part of the second surface 11S2 contacting the part of the first surface 11S1.

When the first substrate 11 is wound around the core C, pressure is generated in the thickness direction of the substrate. This is because winding a substrate film such as the first substrate 11 around the core C repeats an instantaneous operation that presses the substrate film against the core C. At this time, when frictional force or pressing force affecting the first surface 11S1 exceeds the strength of the first surface 11S 1, defects are produced in portions of the alignment layer 21 affected by frictional force or pressing force. Furthermore, small undulations may be produced in the first substrate 11. If undulations are produced in the first substrate 11, a convexo-concave portion in which undulations were produced presses portions contacting the convexo-concave portion. Also in this case, when frictional force or pressing force affecting the first surface 11S1 exceeds the strength of the first surface 11S1, defects occur in portions of the alignment layer 21 affected by the frictional force or pressing force.

In this regard, satisfying Conditions 1 to 3 suppresses defects in the alignment layer 21. In addition, satisfying Condition 2 can decrease haze of the light control sheet 10 occurring when the transparent driving is performed.

According to the present embodiment, the following effects can be obtained.

Since the alignment layer 21 is formed on the base layer 11A having hardness of F or more in the pencil hardness test, the strength of the alignment layer 21 can be increased. In addition, the sum Ra1+Ra2 of the surface roughness Ra1 of the first surface 11S1 and the surface roughness Ra2 of the second surface 11S2 is 5 nm or more. Hence, frictional force generated between the first surface 11S1 and the second surface 11S2 can be reduced to suppress defects in the alignment layer 21. In addition, while surface roughness is distributed between the first surface 11S1 and the second surface 11S2, the surface roughness Ra1 of the first surface 11S1 is set to 20 nm or less. Hence, while excessive increase in haze due to increasing surface roughness of the second surface 11S2 is suppressed, the alignment regulation force of the alignment layer 21 can be maintained favorably. Hence, physical damage to the alignment layer 21 included in the light control sheet 10 can be controlled.

Since the surface roughness of the second surface 11S2 is 100 nm or less, scattering at the second surface 11S2 can be suppressed in the light control sheet 10 using the first substrate 11 and the second substrate 12.

Since the sum Ra1+Ra2 of the surface roughness is 120 nm or less, scattering of light at the second surface 11S2 can be suppressed in the light control sheet 10 using the first substrate 11 and the second substrate 12 while the alignment regulation force of the alignment layer 21 is maintained.

Between the support substrate 24 and the alignment layer 21, the hard coat layer 23 having hardness of F or more in a pencil hardness test is located. Hence, even when the strength of the alignment layer 21 is low because the alignment layer 21 is extremely thin, the alignment layer 21 can be reinforced by the hard coat layer 23.

The diameter of at least some of the particles 23P included in the hard coat layer 23 or the diameter of at least some of agglomerated particles including the particles 23P is greater than the sum of the thickness of the hard coat layer 23, the thickness of the conductive layer 22, and the thickness of the alignment layer 21. Hence, the particles 23P contained in the hard coat layer 23 or the agglomerated particle including the particles 23P project from the first surface 11S1 included in the alignment layer 21. Hence, the surface roughness Ra1 of the first surface 11S1 can be increased. In addition, adjusting the content of the particles 23P can control the surface roughness Ra1.

Since the alignment layer 21 includes silicone resin or polyimide resin, thermal stability and chemical stability of the alignment layer 21 can be enhanced.

Modifications

The above embodiment can be modified and implemented as below. In addition, the following modifications and the above embodiment may be combined and implemented.

Base Layer

The base layer 11A in the above embodiment includes the hard coat layer 23. Alternatively, if the first surface 11S1 satisfies Conditions 1 and 2, the base layer 11A may not include the hard coat layer 23. In this case, for example, the support substrate 24 may have strength high enough that the first surface 11S1 has pencil hardness of F or more.

The base layer 11A in the above embodiment includes the particles 23P contained in the hard coat layer 23. Alternatively, if the surface roughness Ra1 of the first surface 11S1 satisfies Conditions 2 and 3, the base layer 11A may not include the particles 23P. In this case, the alignment layer 21, the conductive layer 22, and the support substrate 24 may have large enough surface roughness that the surface roughness Ra1 of the first surface 11S1 satisfies Conditions 2 and 3.

The base layer 11A in the above embodiment includes the lubricious layer 26. Alternatively, if the second surface 11S2 satisfies at least Condition 3, the base layer 11A may not include the lubricious layer 26. In this case, for example, it is required that the support substrate 24 includes the second surface 11S2, and that the surface roughness Ra2 of the second surface 11S2 satisfies Condition 3. In addition, the second surface 11S2 included in the support substrate 24 preferably satisfies Conditions 4 and 5.

Another film such as a protective film may be stuck on the second surface 24B side of the support substrate 24 to satisfy the surface roughness Ra2 of the 11S2. In this case, when a light control film is used, although the protective film is required to be peeled, design freedom of the support substrate 24 can be improved.

The base layer 11A in the above embodiment includes the particles 26P contained in the lubricious layer 26. Alternatively, if the surface roughness Ra2 of the second surface 11S2 satisfies at least Condition 3, the base layer 11A may not include the particles 26P. In this case, the support substrate 24 may have large surface enough roughness that the surface roughness Ra2 of the second surface 11S2 satisfies the range of Condition 3.

The conductive layer 22 may be located between the support substrate 24 and the hard coat layer 23 in the thickness direction of the base layer 11A. Also in this case, since the base layer 11A has the hard coat layer 23, the effect according to the above described (1) can be obtained. It is noted, in this case, since the distance between the conductive layer 22 and the first surface 11S1 is elongated in the thickness direction of the base layer 11A, a high voltage may be required to drive the liquid crystal molecules.

Light Control Sheet

In the above embodiment, the liquid crystal device is embodied in the reverse-type light control sheet 10 having a linear transmittance decreasing when current is applied and increasing when no current is applied. Alternatively, the liquid crystal device may be embodied as a normal-type light control sheet having a linear transmittance to visible light increasing when current is applied and decreasing when no current is applied. The normal-type light control sheet includes, for example, a light control sheet including a light control layer including a p-type liquid crystal between a pair of alignment layers having horizontal alignment regulation force, or a light control sheet including a light control layer including an n-type liquid crystal between a pair of alignment layers having vertical alignment regulation force. The light control sheet including a light control layer including an n-type liquid crystal has a first substrate, the light control layer, and a second substrate between a pair of polarization plates.

Liquid Crystal Device

A liquid crystal device according to an embodiment of the present invention, to which the transparent substrate for a liquid crystal device is applied, is not limited to the light control sheet described above if the liquid crystal device includes an alignment layer. For example, the liquid crystal device may be, for example, a liquid crystal display.

EXAMPLE

Examples and comparative examples will be described with reference to FIG. 4. It is noted that these do not necessarily limit the present invention.

Example 1

Preparation of Lubricious Layer

First, a coating material for a lubricious layer for forming a lubricious layer was adjusted. Acrylic particles (Techpolymer SSX-102, made by Sekisui Kasei Co., Ltd), having an average particle diameter of 2 were added at 0.02% by weight to a highly cross-linked acrylic hard coating agent (Lioduras LCH6701, made by Toyochem Co., Ltd). Furthermore, methyl ethyl ketone was added to the hard coat coating material to adjust the solid content concentration including acrylic particles to 50% by weight.

A film including polyethylene terephthalate (PET) (Cosmoshine A4300, made by Toyobo Co., Ltd) (Cosmoshine is a registered trademark) was prepared. The overall thickness of the PET film was 125 μm. The adjusted coating material for a lubricious layer was applied to one surface of the PET film by using a gravure coater. At this time, the coating material was applied so that the thickness of a portion of the cured lubricious layer, in which no acrylic particles were present, became 1.5 μm. After the PET film to which the coating material for a lubricious layer was applied was dried for one minute at 80° C., the PET film was exposed at an exposure amount of 300 mJ/cm² using a high-pressure mercury vapor lamp to cure the lubricious layer. Then, the PET film on which the lubricious layer was formed was wound in-line to obtain a wound film roll with the lubricious layer.

Preparation of Hard Coat Layer

Next, on the film having the lubricious layer, a hard coat layer was formed on a surface opposite to the surface on which the lubricious layer was formed. First, a hard coat coating material (first coating material) was adjusted. Acrylic particles (Techpolymer SSX-102, made by Sekisui Kasei Co., Ltd), which have an average particle diameter of 2 μm, were added at 0.02% by weight to the highly cross-linked acrylic resin hard coating agent (Lioduras LCH6701, made by Toyochem Co., Ltd). Furthermore, methyl ethyl ketone was added to the hard coat coating material to adjust the solid content concentration to 50% by weight.

The film having the lubricious layer was coated with the adjusted hard coat coating material on a surface opposite to the surface on which the lubricious layer was formed, by using a gravure coater. At this time, the coating material was applied so that the thickness of a portion of the cured hard coat layer, in which no acrylic particles were present, became 1.5 μm. After the PET film with the lubricious layer to which the hard coat coating material was applied was dried for one minute at 60° C., the PET film was exposed at an exposure amount of 300 mJ/cm$^2$ using a high-pressure mercury vapor lamp to cure the hard coat layer. Then, the film on which the hard coat layer was formed was wound in-line to obtain a wound film roll having the hard coat layer.
Preparation of Conductive Layer Next, a conductive layer was formed on the hard coat layer. For film formation of the conductive layer, a roll sputtering apparatus including a mixed sintering target including indium oxide (90% by weight) and tin oxide (10% by weight) was used. A film roll was set in the roll sputtering apparatus, and the apparatus was evacuated until pressure in the apparatus became 0.4 Pa. Thereafter, argon gas and oxygen gas were introduced into the apparatus. The substrate temperature, which is a temperature applied to the film, was set to 40° C., and film formation was performed at a pressure of 0.4 Pa. Accordingly, a conductive layer having a thickness of 50 nm was formed on the base layer. Furthermore, a PET film on which the conductive layer was formed was subjected to heat treatment for ninety minutes at a temperature of 140° C. to crystallize the conductive layer. The film with the conductive layer was wound in a roll shape.
Preparation of Alignment Layer Next, the alignment layer was laminated on the conductive layer. A coating material for an alignment layer whose main material was polyamic acid (Sunever SE-H682, made by Nissan Chemical Cooperation) (Sunever is a registered trademark) was adjusted by using a solvent so that the solid content became 5% by weight to obtain a coating fluid for forming an alignment layer. In the solvent, the ratio by weight between propylene glycol monomethyl ether and γ-butyrolactone was set as below.

Propylene glycol monomethyl ether: γ-butyrolactone=8:2
The film with the conductive layer was drawn out from the film roll, and the coating material for an alignment layer was applied to the conductive layer using a roll coater. Then, the film on which the coating material for the alignment layer was applied was dried for five minutes at a temperature of 150° C. to form an alignment layer having a thickness of 100 nm. Hence, the coating material whose main raw material was polyamic acid became an alignment layer whose main skeleton was polyimide. The film on which the alignment layer was laminated was wound in a roll and collected. Thereby, a film including the base layer was obtained. The film roll obtained by winding the film with the base layer was prepared as 1 set of 2 rolls. The transparent substrate for a liquid crystal device was stored for seven days in a clean room in which the temperature was kept at 23° C., and the relative humidity was kept at 50% RH. The film with the base layer was used as a sample of a single film.
Characteristics of Transparent Substrate for Liquid Crystal Device The film with the base layer was drawn out from the film roll and was cut to a predetermined size. Thereafter, the following evaluation was performed.
Measurement of Surface Roughness of First Surface For the first surface included in the alignment layer, arithmetic mean roughness was measured by using a white interferometer (VertScan R3300h Lite, made by Ryoka Systems Inc.). In this case, a field of view having a rectangular shape, a width of 1.408 and a length of 1.885 mm, was used as a measurement target of the arithmetic mean roughness. In addition, the arithmetic mean roughness was measured by a method based on JIS B 0601:2013. Then, the arithmetic mean roughness was set as the surface roughness Ra1 of the first surface. The surface roughness Ra1 of the first surface in example 1 was 4 nm.

Measurement of Surface Roughness of Second Surface

For the second surface included in the lubricious layer 26, the surface roughness Ra2 was measured. The surface roughness Ra2 of the second surface was measured as in the surface roughness Ra1 of the first surface. In example 1, the surface roughness Ra2 of the second surface was 3 nm.
Sum of Surface Roughness The sum of the surface roughness Ra1 of the first surface and the surface roughness Ra2 of the second surface was determined. In Example 1, the sum of the surface roughness Ra1 and the surface roughness Ra2 was 7 nm.
Measurement of Pencil Hardness For the surface of the base layer contacting the alignment layer, a pencil hardness test was performed. In this case, a method based on JIS K 5600-5-4: 1999 "Testing methods for paints—Part 5: Mechanical property of Film—Section 4: Scratch Hardness (Pencil Method)" was used. In Example 1, the pencil hardness was H.
Appearance of Film Roll The winding condition of a film roll was visually observed to determine whether sticking of two surfaces of the substrate or bulging occurred. As a criterion, a film roll in which no sticking of two surfaces of the substrate and no bulging occurred was used. When the winding condition of the film roll was deformed compared with the criterion, it was determined that sticking of the two surfaces of the substrate or bulging had occurred in the film roll. For example, the film roll was viewed from the front side thereof to visually recognize the surface of the substrate. At this time, sticking of the two surfaces of the substrate was recognized as a portion that was excessively transparent compared with the periphery thereof. In addition, the film roll was viewed from the lateral side thereof to visually recognize an edge face of the wound substrate. At this time, if the film roll was not wound in a state in which the edge face of the substrate had a substantially circular shape but was wound in a state in which the edge face of the substrate had a polygonal shape, it was judged that sticking or bulging occurred. If sticking of two surfaces of the substrate or bulging occurs, when the substrate is drawn out from the roll film, situations may occur in which the substrate itself is deformed, or in the worst case, the film may break, or the like. When sticking of two surfaces of the substrate or bulging occurred, it was judged as poor, and when neither sticking of two surfaces of the substrate nor bulging was seen, it was judged as excellent.
Preparation of Light Control Sheet A film roll on which the film with the base layer was wound was stored for seven days in a clean room in which the temperature was kept at 23° C., and the relative humidity was kept at 50%. Thereafter, the film roll was transferred to a place at which the next process was to be performed.

A light control layer was prepared between a pair of films each having an alignment layer. An ultraviolet curing coating agent (Loctite 3736, made by Henkel AG & Co. KGaA) at 17.5 parts by weight and 1, 9-nonanediol methacrylate at 17.5 parts by weight were combined. Furthermore, with this mixture, an n-type liquid crystal composition (MLC-6608, made by Merck KGaA) at 65 parts by weight was combined to obtain a coating material for a light control layer.

Bead spacers, whose main component was divinylbenzene and which had a grain diameter of 6 μm, were dispersed in isopropyl alcohol. This spacer dispersant was applied to a first surface of the film with an alignment layer so that an occupied area of the bead spacers was 1.5%. Then, the film on which the spacer dispersant was applied was dried at a temperature of 100° C., and the film was wound.

The film with the alignment layer was drawn out from the first film roll obtained by winding the film with an alignment layer on which the bead spacers were dispersed, and a light control layer coating material was applied on the alignment layer by using a die head coater. Next, under a nitrogen atmosphere, the light control layer coating material was irradiated with ultraviolet rays by using a high-pressure mercury vapor lamp in which light having a wavelength of 350 nm or less was cut off, to cure the light control layer coating material. At this time, illuminance was set to 20 mW/cm$^2$, irradiation time was set to 30 s, and temperature was set to 25° C. Furthermore, the film with an alignment layer drawn out from the second film roll was laminated and joined to the light control layer. Hence, a light control sheet was obtained in which the light control layer was sandwiched between the pair of films each having an alignment layer.

Example 2

A single film and a light control sheet were prepared by a method similar to that of Example 1 except for changing the amount of added acrylic particles, which were added to the lubricious layer, to 1.00% by weight. In Example 2, the surface roughness Ra1 of the first surface was 5 nm, the surface roughness Ra2 of the second surface was 40 nm, and the sum of the surface roughness Ra1 and the surface roughness Ra2 was 45 nm. The pencil hardness of the surface of the base layer was H.

Example 3

A single film and a light control sheet were prepared by a method similar to that of Example 1 except for changing the amount of added acrylic particles, which were added to the lubricious layer, to 3.00% by weight. In Example 3, the surface roughness Ra1 of the first surface was 4 nm, the surface roughness Ra2 of the second surface was 97 nm, and the sum of the surface roughness Ra1 and the surface roughness Ra2 was 101 nm. The pencil hardness of the surface of the base layer was H.

Example 4

A single film and a light control sheet were prepared by a method similar to that of Example 1 except for changing the amount of added acrylic particles of the hard coat layer to 0.025% by weight. In Example 4, the surface roughness Ra1 of the first surface was 6 nm, the surface roughness Ra2 of the second surface was 5 nm, and the sum of the surface roughness Ra1 and the surface roughness Ra2 was 11 nm. The pencil hardness of the surface of the base layer was H.

Example 5

A single film and a light control sheet were prepared by a method similar to that of Example 1 except for changing the amount of added acrylic particles of the hard coat layer to 0.025% by weight and changing the amount of added acrylic particles, which were added to the lubricious layer, to 1.00% by weight. In Example 5, the surface roughness Ra1 of the first surface was 9 nm, the surface roughness Ra2 of the second surface was 35 nm, and the sum of the surface roughness Ra1 and the surface roughness Ra2 was 44 nm. The pencil hardness of the surface of the base layer was H.

Example 6

A single film and a light control sheet were prepared by a method similar to that of Example 1 except for changing the amount of added acrylic particles of the hard coat layer to 0.025% by weight and changing the amount of added acrylic particles, which were added to the lubricious layer, to 3.00% by weight. In Example 6, the surface roughness Ra1 of the first surface was 6 nm, the surface roughness Ra2 of the second surface was 100 nm, and the sum of the surface roughness Ra1 and the surface roughness Ra2 was 106 nm. The pencil hardness of the surface of the base layer was H.

Example 7

A single film and a light control sheet were prepared by a method similar to that of Example 1 except for changing the amount of added acrylic particles of the hard coat layer to 0.45% by weight. In Example 7, the surface roughness Ra1 of the first surface was 18 nm, the surface roughness Ra2 of the second surface was 5 nm, and the sum of the surface roughness Ra1 and the surface roughness Ra2 was 23 nm. The pencil hardness of the surface of the base layer was H.

Example 8

A single film and a light control sheet were prepared by a method similar to that of Example 1 except for changing the amount of added acrylic particles of the hard coat layer to 0.45% by weight and changing the amount of added acrylic particles, which were added to the lubricious layer, to 1.00% by weight. In Example 8, the surface roughness Ra1 of the first surface was 17 nm, the surface roughness Ra2 of the second surface was 50 nm, and the sum of the surface roughness Ra1 and the surface roughness Ra2 was 67 nm. The pencil hardness of the surface of the base layer was H.

Example 9

A single film and a light control sheet were prepared by a method similar to that of Example 1 except for changing the amount of added acrylic particles of the hard coat layer to 0.45% by weight and changing the amount of added acrylic particles, which were added to the lubricious layer, to 3.00% by weight. In Example 9, the surface roughness Ra1 of the first surface was 19 nm, the surface roughness Ra2 of the second surface was 99 nm, and the sum of the surface roughness Ra1 and the surface roughness Ra2 was 118 nm. The pencil hardness of the surface of the base layer was H.

Example 10

A single film and a light control sheet were prepared by a method similar to that of Example 1 except for using, instead of the first coating material, a second coating material (Lioduras TP-203X coating agent, made by Toyo Ink Co., Ltd) as the acrylic resin hard coat layer coating material, adding no acrylic particles to the hard coat layer, and changing the amount of added acrylic particles, which were added to the lubricious layer, to 3.00% by weight. It is noted that the acrylic resin used in Example 10 has a degree of cross-linkage lower than that of the acrylic resin used in Example 1. In Example 10, the surface roughness Ra1 of the first surface was 2 nm, the surface roughness Ra2 of the second surface was 98 nm, and the sum of the surface roughness Ra1 and the surface roughness Ra2 was 100 nm. The pencil hardness of the surface of the base layer was HB.

Example 11

A single film and a light control sheet were prepared by a method similar to that of Example 1 except for changing the amount of added acrylic particles, which were added to the lubricious layer, to 4.00% by weight. In Example 11, the surface roughness Ra1 of the first surface was 4 nm, the surface roughness Ra2 of the second surface was 125 nm, and the sum of the surface roughness Ra1 and the surface roughness Ra2 was 129 nm. The pencil hardness of the surface of the base layer was H.

Example 12

A single film and a light control sheet were prepared by a method similar to that of Example 1 except for adding no acrylic particles to the hard coat layer and changing the amount of added acrylic particles, which were added to the lubricious layer, to 3.00% by weight. In Example 12, the surface roughness Ra1 of the first surface was 3 nm, the surface roughness Ra2 of the second surface was 98 nm, and the sum of the surface roughness Ra1 and the surface roughness Ra2 was 101 nm. The pencil hardness of the surface of the base layer was H.

Example 13

A single film and a light control sheet were prepared by a method similar to that of Example 1 except for adding no acrylic particles to the hard coat layer and changing the amount of added acrylic particles, which were added to the lubricious layer, to 0.10% by weight. In Example 13, the surface roughness Ra1 of the first surface was 2 nm, the surface roughness Ra2 of the second surface was 5 nm, and the sum of the surface roughness Ra1 and the surface roughness Ra2 was 7 nm. The pencil hardness of the surface of the base layer was H.

Comparative Example 1

A single film and a light control sheet were prepared by a method similar to that of Example 1 except for adding no acrylic particles to the hard coat layer and the lubricious layer. In Comparative Example 1, the surface roughness Ra1 of the first surface was 1 nm, the surface roughness Ra2 of the second surface was 2 nm, and the sum of the surface roughness Ra1 and the surface roughness Ra2 was 3 nm. The pencil hardness of the surface of the base layer was H.

Comparative Example 2

A single film and a light control sheet were prepared by a method similar to that of Example 1 except for changing the amount of added acrylic particles of the hard coat layer to 0.839% by weight and adding no acrylic particles to the lubricious layer. In Comparative Example 2, the surface roughness Ra1 of the first surface was 31 nm, the surface roughness Ra2 of the second surface was 2 nm, and the sum of the surface roughness Ra1 and the surface roughness Ra2 was 33 nm. The pencil hardness of the surface of the base layer was H.

Comparative Example 3

A single film and a light control sheet were prepared by a method similar to that of Example 1 except for providing no hard coat layer, providing the conductive layer and the alignment layer to the support substrate, and changing the amount of added acrylic particles, which were added to the lubricious layer, to 3.00% by weight. In Comparative Example 3, the surface roughness Ra1 of the first surface was 2 nm, the surface roughness Ra2 of the second surface was 98 nm, and the sum of the surface roughness Ra1 and the surface roughness Ra2 was 100 nm. The pencil hardness of the surface of the base layer was 2B.

Evaluation of Light Control Sheets

Evaluation of the light control sheets of Examples 1 to 13 and Comparative Examples 1 to 3 were performed. The number of defects and haze of each of the light control sheets are illustrated in FIG. 4.

Measurement of Haze

For transparent substrates for a liquid crystal device of Examples 1 to 13 and Comparative Examples 1 to 3, haze was measured by a method based on to JIS K 7136:2000 "Plastics—Determination of haze for transparent materials". A transparent substrate whose haze was 1.0% or less was judged as excellent, and a transparent substrate whose haze was more than 1.0% was judged as poor.

Measurement of Haze

From the light control sheets of the examples and the comparative examples, an A3 size test piece was cut out. In each of the test pieces, part of each ITO layer was externally exposed, whereby a terminal for applying voltage to the light control sheet was formed. Then, for each test piece, haze was measured in a state in which no voltage is applied. In addition, the exposed conductive layers were held by alligator clips, and an AC voltage of 40V was applied between a pair of conductive layers at a frequency of 60 Hz by using an AC power-supply device (PCR-3000WE, made by Kikusui Electronics Corp.). Then, haze was measured by using a haze meter (NDH-7000SP, made by Suga Test Instruments Co., Ltd.) while voltage was applied. When haze was measured, a method based on JIS K 7136:2000 "Plastics—Determination of haze for transparent materials" was used. Test pieces having haze of 15% or less when transparent driving was performed were judged as excellent, and test pieces having haze of more than 15% when transparent driving was performed were judged as poor. Test pieces having haze of 15% or less when opaque driving was performed were judged as excellent, and test pieces having haze of more than 15% when opaque driving was performed was judged as poor.

Number of Defects of Light Control Film

A light control film was cut to obtain a piece as a sample having a size of 1 m*1 m. Without application of a drive voltage to the sample, light from a three-wavelength light source having illuminance of 1000 lx or more was radiated, and the number of defective portions was visually counted. The defective portions were portions that appear white turbid compared with the periphery thereof when the light control film is viewed, and that have a maximum diameter of 2 nm or more. If the number of defects of the alignment layer is large, alignment regulation force becomes insufficient when transparent driving is performed, whereby liquid crystal molecules are not aligned vertically but randomly. Hence, incident light is scattered, whereby the defective portions appear white turbid. A sample having less than 50 defects was judged as excellent, and a sample having 50 or more defects was judged as poor.

Overall Evaluation

A sample with excellent evaluation in the Number of Defects of Light Control Film was judged as a non-defective product, and a sample with poor evaluation in the Number of Defects of Light Control Film was judged as a defective product.

Evaluation Results

In Comparative Example 1, the sum Ra1+Ra2 of surface roughness was 3 nm, and Condition 3 was not satisfied.

Since phenomena such as sticking and bulging were confirmed in the winding condition, an evaluation was made as poor. It can be considered that this is because sticking of two surfaces of the substrate was caused due to the too-smooth first surface and second surface. In addition, the number of defects in the alignment layer was 50 or more. Since the number of defects was large, an evaluation was made as poor. It can be considered that this was because sticking of the two surfaces of the substrate occurred, which caused peeling of the alignment layer when the substrate was drawn out. Hence, in the overall evaluation, the substrate and the light control sheet of Comparative Example 1 were judged as a defective product.

In Comparative Example 2, since the surface roughness Ra1 of the first surface was 30 nm, Condition 2 was not satisfied. In addition, when a light control sheet was prepared which was produced by drawing out the transparent substrate for a liquid crystal device from this film roll, the number of defective portions of the transparent substrate for a liquid crystal device was large, and white turbid parts and transparent parts were mixed. Hence, a sample having an even haze that could be measured by a haze meter could not be obtained, whereby optical characteristics such as haze were difficult to measure. Hence, it was determined that measurement could not be performed. In addition, the number of defects of the light control sheet was 50 or more. Since the number of defects was large, it was judged as poor. It can be considered that this is because alignment regulation force of the alignment layer was lowered because the surface roughness Ra1 of the first surface was excessive. Hence, the overall evaluation was made that this was a defective product.

In Comparative Example 3, since the hard coat layer was not provided, hardness of the first surface was low, which did not satisfy Condition 1. In addition, when a light control sheet was prepared which was produced by drawing out the transparent substrate for a liquid crystal device from this film roll, since the number of defective portions of the transparent substrate for a liquid crystal device was large, haze was measured for selected transparent parts. The number of defects of the light control sheet was obviously 50 or more, which was excessive. Hence, the count was terminated. It can be considered that since the strength of the alignment layer was low, when the transparent substrate for a liquid crystal device was wound in a roll shape, transported, drawn out, or the like, the alignment layer became peeled. Hence, the overall evaluation was made that this was a defective product.

A reverse-type light control sheet has relatively low haze in a state in which no voltage is applied between a pair of conductive layers and a relatively high haze in a state in which voltage is applied between the pair of conductive layers. An example of the reverse-type light control sheet includes a light control layer including liquid crystal molecules, a pair of conductive layers (transparent electrodes) sandwiching the light control layer in the thickness direction of the light control layer, and alignment layers respectively located between the light control layer and the conductive layers (for example, refer to JP-A-2018-45135). In the light control sheet, in the state in which no voltage is applied between the pair of conductive layers, the alignment layers produce vertical alignment of the liquid crystal molecules. In the state in which voltage is applied between the pair of conductive layers, the liquid crystal molecules are randomly aligned, and this causes multiple reflection of incident light at an interface between the polymer and liquid crystal molecules.

Meanwhile, from the point of view of making it possible to mass-produce light control sheets, light control sheets and transparent substrates including alignment layers are required to be produced using roll-to-roll equipment. When the transparent substrate is produced using roll-to-roll equipment, the transparent substrate, and furthermore, the alignment layers included in the transparent substrate are affected by external forces when the transparent substrate is transferred by the roll-to-roll equipment, when the transparent substrate is wound using the roll-to-roll equipment, and when the wound transparent substrate is transported, whereby the alignment layers may be physically damaged. As described above, the transparent substrate including the alignment layers has new problems due to producing the transparent substrate by using the roll-to-roll equipment.

The above matters concern not only transparent substrates for light control sheets but also other transparent substrates for liquid crystal devices produced using roll-to-roll equipment.

A transparent substrate for a liquid crystal device according to an embodiment of the present invention includes an alignment layer that regulates an alignment direction of liquid crystal molecules contained in a liquid crystal layer included in the liquid crystal device and a base layer on which the alignment layer is formed. The transparent substrate includes a first surface and a second surface opposite to the first surface. The first surface is part of the alignment layer.

The second surface is part of the base layer. A surface, which contacts the alignment layer, of the base layer has hardness of F or more in a pencil hardness test. A surface roughness Ra1 of the first surface is 20 nm or less, and a sum Ra1+Ra2 of the surface roughness Ra1 of the first surface and surface roughness Ra2 of the second surface is 5 nm or more.

The light control sheet according to an embodiment of the present invention contacts the first surface of the transparent substrate for the liquid crystal device and contains liquid crystal molecules.

According to the above configuration, since the alignment layer is formed on the base layer having a hardness of F or more in the pencil hardness test, the strength of the alignment layer can be increased. The sum Ra1+Ra2 of the surface roughness Ra1 of the first surface and the surface roughness Ra2 of the second surface is 5 nm or more. Hence, frictional force generated between the first surface and the second surface can be reduced to suppress defects in the alignment layer. In addition, when surface roughness is distributed between the first surface and the second surface, the surface roughness Ra1 of the first surface is set to 20 nm or less. Hence, while excessive increase in haze due to increasing surface roughness of the second surface is suppressed, alignment regulation force of the alignment layer can be maintained favorably. Hence, physical damage to the alignment layer included in the transparent substrate for the liquid crystal device can be controlled.

In the transparent substrate for the liquid crystal device, the surface roughness Ra2 of the second surface may be 100 nm or less.

According to the above configuration, the liquid crystal device using the transparent substrate for the liquid crystal device can suppress scattering at the second surface.

In the transparent substrate for the liquid crystal device, the sum Ra1+Ra2 of the surface roughness Ra1 of the first surface and the surface roughness Ra2 of the second surface may be 120 nm or less.

According to the above configuration, scattering at the second surface can be suppressed in the liquid crystal device using the transparent substrate for the liquid crystal device while the alignment regulation force of the alignment layer is maintained.

In the transparent substrate for the liquid crystal device, the base layer includes a support substrate, a hard coat layer, a conductive layer, and the alignment layer, and the hard coat layer is located between the support substrate and the alignment layer.

According to the above configuration, even when the strength of the alignment layer is low because the alignment layer is extremely thin, the alignment layer can be reinforced by the hard coat layer.

In the transparent substrate for the liquid crystal device, the hard coat layer includes particles, and a diameter of the particles or a diameter of agglomerated particles including particles is greater than a sum of a thickness of the hard coat layer, a thickness of the conductive layer, and a thickness of the alignment layer.

According to the above configuration, the particles contained in the hard coat layer project from the first surface included in the alignment layer. Hence, adjusting the content of the particles can control the surface roughness.

In the transparent substrate for the liquid crystal device, at least some of the particles included in the base layer may project from at least one of the first surface and the second surface.

According to the above configuration, adjusting the content of the particles included in the base layer can control the surface roughness.

In the transparent substrate for the liquid crystal device, the alignment layer may include silicone resin or polyimide resin.

According to the above configuration, the strength of the alignment layer itself can be increased.

In an embodiment of the present invention, physical damage to the alignment layer included in the transparent substrate for the liquid crystal device can be controlled.

Obviously, numerous modifications and variations of the present invention are possible in light of the above teachings. It is therefore to be understood that within the scope of the appended claims, the invention may be practiced otherwise than as specifically described herein.

The invention claimed is:

1. A transparent substrate for a liquid crystal device, comprising:
   a base layer; and
   an alignment layer formed on the base layer such that the alignment layer has a surface forming a first surface of the transparent substrate and that the base layer has a surface forming a second surface of the transparent substrate on an opposite side with respect to the first surface,
   wherein the alignment layer regulates an alignment direction of liquid crystal molecules in a liquid crystal layer in the liquid crystal device, the base layer has a surface that is in contact with the alignment layer such that the surface in contact with the alignment layer has hardness of F or more in a pencil hardness test, and the first surface of the transparent substrate has a surface roughness Ra1 of 20 nm or less such that a sum Ra1+Ra2 of the surface roughness Ra1 of the first surface and surface roughness Ra2 of the second surface is 5 nm or more.

2. The transparent substrate for the liquid crystal device according to claim 1, wherein the surface roughness Ra2 of the second surface is 100 nm or less.

3. The transparent substrate for the liquid crystal device according to claim 2, wherein the sum Ra1+Ra2 of the surface roughness Ra1 of the first surface and the surface roughness Ra2 of the second surface is 120 nm or less.

4. The transparent substrate for the liquid crystal device according to claim 2, wherein the base layer includes a support substrate and a hard coat layer such that the hard coat layer is positioned between the support substrate and the alignment layer.

5. The transparent substrate for the liquid crystal device according to claim 1, wherein the sum Ra1+Ra2 of the surface roughness Ra1 of the first surface and the surface roughness Ra2 of the second surface is 120 nm or less.

6. The transparent substrate for the liquid crystal device according to claim 5, wherein the base layer includes particles such that at least a portion of the particles in the base layer projects from at least one of the first surface and the second surface.

7. The transparent substrate for the liquid crystal device according to claim 5, wherein the alignment layer includes silicone resin or polyimide resin.

8. The transparent substrate for the liquid crystal device according to claim 1, wherein the base layer includes a support substrate and a hard coat layer such that the hard coat layer is positioned between the support substrate and the alignment layer.

9. The transparent substrate for the liquid crystal device according to claim 8, wherein the hard coat layer includes particles such that a diameter of the particles or a diameter of agglomerated particles including the particles is greater than a sum of a thickness of the hard coat layer, a thickness of the conductive layer, and a thickness of the alignment layer.

10. The transparent substrate for the liquid crystal device according to claim 8, wherein the base layer includes a conductive layer such that the hard coat layer is positioned between the support substrate and the conductive layer.

11. The transparent substrate for the liquid crystal device according to claim 10, wherein the hard coat layer includes particles such that a diameter of the particles or a diameter of agglomerated particles including the particles is greater than a sum of a thickness of the hard coat layer, a thickness of the conductive layer, and a thickness of the alignment layer.

12. The transparent substrate for the liquid crystal device according to claim 10, wherein the base layer includes a lubricious layer.

13. The transparent substrate for the liquid crystal device according to claim 12, wherein the hard coat layer includes particles such that a diameter of the particles or a diameter of agglomerated particles including the particles is greater than a sum of a thickness of the hard coat layer, a thickness of the conductive layer, and a thickness of the alignment layer.

14. The transparent substrate for the liquid crystal device according to claim 8, wherein the base layer includes particles such that at least a portion of the particles in the base layer projects from at least one of the first surface and the second surface.

15. The transparent substrate for the liquid crystal device according to claim 8, wherein the alignment layer includes silicone resin or polyimide resin.

16. The transparent substrate for the liquid crystal device according to claim 1, wherein the base layer includes particles such that at least a portion of the particles in the base layer projects from at least one of the first surface and the second surface.

17. The transparent substrate for the liquid crystal device according to claim 1, wherein the alignment layer includes silicone resin or polyimide resin.

18. The transparent substrate for the liquid crystal device according to claim 1, wherein the base layer includes particles such that at least a portion of the particles in the base layer projects from at least one of the first surface and the second surface.

19. The transparent substrate for the liquid crystal device according to claim 1, wherein the alignment layer includes silicone resin or polyimide resin.

20. A light control sheet, comprising:
   the transparent substrate of claim 1; and
   a light control layer formed such that the light control layer is in contact with the first surface of the transparent substrate and includes liquid crystal molecules.

\* \* \* \* \*